United States Patent [19]

Jensen

[11] Patent Number: 4,758,259

[45] Date of Patent: Jul. 19, 1988

[54] HOLLOW GLASS FIBER BUSHING, METHOD OF MAKING HOLLOW FIBERS AND THE HOLLOW GLASS FIBERS MADE BY THAT METHOD

[75] Inventor: Thomas H. Jensen, Murrysville, Pa.

[73] Assignee: PPG Industries, Inc., Pittsburgh, Pa.

[21] Appl. No.: 85,313

[22] Filed: Aug. 10, 1987

Related U.S. Application Data

[63] Continuation of Ser. No. 914,415, Oct. 2, 1986, abandoned, which is a continuation-in-part of Ser. No. 812,105, Dec. 23, 1985, abandoned.

[51] Int. Cl.⁴ .......................................... C03B 37/022
[52] U.S. Cl. ................................. 65/1; 65/2; 65/86; 425/133.1; 425/462
[58] Field of Search ................... 65/1, 2, 86, 121; 425/133.1, 462, DIG. 217, 398, 401

[56] References Cited

U.S. PATENT DOCUMENTS

| | | | |
|---|---|---|---|
| 3,257,183 | 6/1966 | Slayter et al. | 65/86 X |
| 3,268,313 | 8/1966 | Burgman et al. | 65/5 |
| 3,412,873 | 1/1969 | Burgman et al. | 65/1 |
| 3,510,393 | 5/1970 | Burgman et al. | 65/3 X |
| 3,526,571 | 9/1970 | Ogata | 425/DIG. 217 |

*Primary Examiner*—Robert L. Lindsay
*Attorney, Agent, or Firm*—John E. Curley

[57] ABSTRACT

A method and apparatus for producing hollow glass fibers is described in which the glass from a bushing tip and the gas used to provide a lumen in fibers as they are drawn from the tip are fed from passages in the tip sized to provide desired inside to outside diameter in the fibers drawn at the tip. This ratio is established inside of the tip by sizing the gas column having the tip and the glass column leaving the tip such that the ratio of the gas column to glass column is substantially the same ratio desired in the hollow fiber being drawn. Apparatus used to produce this ratio is also shown.

11 Claims, 1 Drawing Sheet

HOLLOW GLASS FIBER BUSHING, METHOD OF MAKING HOLLOW FIBERS AND THE HOLLOW GLASS FIBERS MADE BY THAT METHOD

This application is a continuation of application Ser. No. 914,415 filed Oct. 2, 1986 which is a CIP of Ser. No. 812,105 filed Dec. 22, 1985, both abandoned.

The present invention relates to the production of hollow glass fibers. More particularly, the present invention relates to methods and apparatus utilized to produce hollow fibers. Still more particularly, the present invention relates to apparatus and methods used in producing hollow fibers having more uniform ratios of internal to external diameters.

BACKGROUND OF THE INVENTION

In U.S. Pat. No. 3,510,393 assigned to the Assignee of the instant application, a hollow glass fiber strand article is described. Hollow glass fibers of the claimed strands typified in this patent are fibers having outside diameters of 0.0003 to 0.003 inches and having 10 to 65 percent of their volume hollow. The hollow glass fibers described in the aforementioned patent found use in filament wound application, such as a resin reinforcement for radar domes, and may also be used as a resin reinforcement for motor cases, storage tanks and the like. The advantage of hollow glass fibers was to provide a significant improvement in the strength to weight ratio of reinforcing fibers utilized to reinforce composites. Also provided, as stated in the aforementioned patent, was a significant reduction in the dielectric constant of materials reinforced with the hollow glass fibers of the patent over those reinforced with solid fibers.

In U.S. Pat. No. 3,268,313 apparatus suitable for use in manufacturing the hollow glass fibers in the aforementioned patent is shown. Similarly, in U.S. Pat. No. 3,421,873 alternative apparatus and methods are described where fibers can be produced which have intermittent hollowness along their length.

While the aforementioned apparatus, methods and fibers have found some utility in the market place, their use has been limited due to several factors. One factor was the high cost of preparing the hollow glass fibers. This cost was high due to the fact that the apparatus was difficult to operate on a continuous basis without many process interruptions occurring during the formation of the fibers. The manufacturing costs consequently required high selling prices which was a deterrent in the marketplace. Further, the fibers produced by the processes and apparatus described in these patents, while hollow when initially produced from commercial size bushings, after a period of time produced were found to contain a significant large number of solid fibers as well as hollow glass fibers. Still further, the hollow glass fibers produced in a multiple fiber strand had little or no uniformity with respect to the concentricity of the central lumen of the fibers. Stated another way, the K value of the fibers, that is the ratio of the inside diameter of the central lumen of the fiber to the outside diameter of the hollow fiber was found to be very erratic and subject to wide variations in any given strand of fibers produced.

Thus, despite the advent of the processes in the prior art to manufacture hollow glass fibers, the need still exists for processes and apparatus for producing hollow glass fibers of more uniform configuration and quality. Hollow glass fiber strands containing hollow filaments or fibers therein which possess more uniform ratios of inside to outside diameters and better concentricity of the central lumen are still a desired goal.

In accordance with this invention a process for producing improved hollow glass fibers is provided. The fibers made by the process are characterized in their new form by having a better concentricity in the central lumen than heretofore possible and more uniform K values than fibers heretofore produced. This results in a more uniform strength to weight ratio when these fibers are utilized in composites to provide strength to such materials as thermoset and thermoplastic resins. The novel apparatus described to produce the improved hollow fibers is durable, simple in construction and provides consistent fiber quality during the bushing life.

SUMMARY OF THE INVENTION

It is an object of the instant invention to provide an improved method of preparing hollow glass fibers.

It is another invention of the invention to provide a fiber glass bushing capable of producing hollow glass fibers of improved quality.

A still further object of the invention is to provide apparatus for producing glass fibers having K values more uniform than those heretofore obtainable.

A still further object of the invention is to provide a method for producing glass fibers having specific K values.

Thus, in accordance with the instant invention, hollow glass fibers are produced by passing molten glass through an annulus in a bushing tip formed by the exterior walls of a gas delivery tube and the interior walls of the tip in which it is located. The gas from the gas delivery tube is drawn into the molten glass as it exits the glass forming tip to provide the hollow lumen in the fiber of glass formed at the tip. The method of forming the hollow fibers also involves establishing in the tip a ratio between the internal diameter of the gas delivery tube and the internal diameter of the tip which approximates the ratio of lumen diameter to fiber diameter desired in the finished fiber being produced.

In another aspect, the invention involves providing a bushing tip and and a centrally located gas delivery tube inside the bushing tip to form an annulus in the tip through which molten glass flows to the exterior of the tip. The gas delivery tube is provided with a gas passage having a precise diameter as does the bushing tip. The ratio of the internal diameter of the passage to the internal diameter of the tip is designed to be substantially the same as that desired in the final product; generally, in the range of 0.5 to 0.9, preferably between 0.6 and 0.8.

These and other objects of the instant invention will become apparent to those skilled from the ensuing description of the invention.

BRIEF DESCRIPTION OF THE DRAWING

For a more complete understanding of the present invention, reference is made to the accompanying drawing in which.

DETAILED DESCRIPTION OF THE DRAWING

Figure 1:
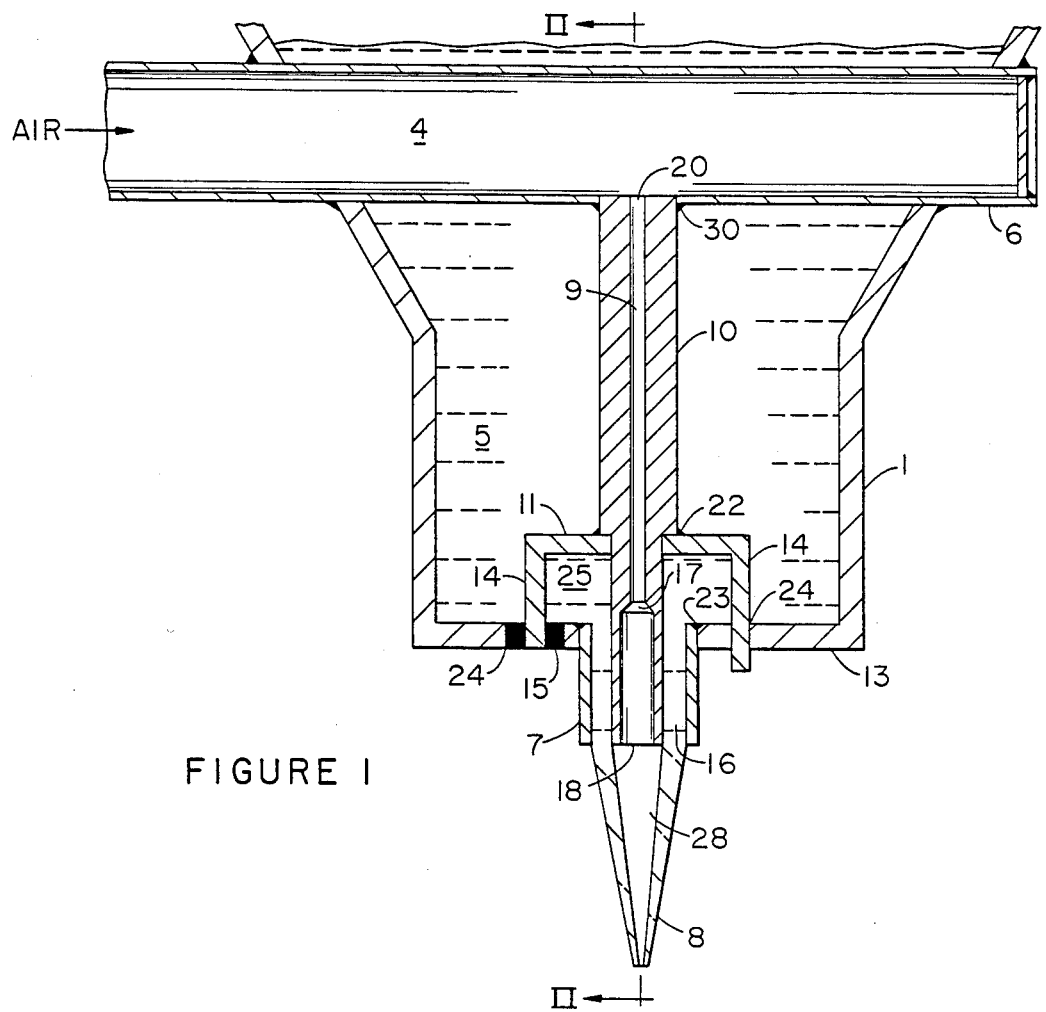
FIG. 1 is a side elevation of a bushing suitable for producing improved hollow glass fibers.
Figure 2:
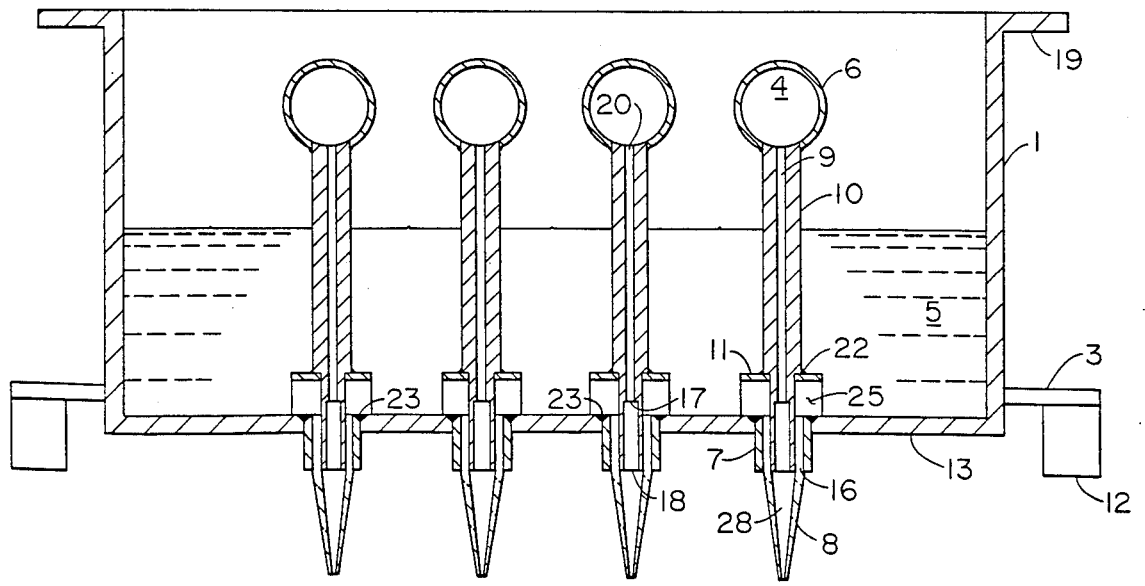
FIG. 2 is a front elevation of a bushing constructed in accordance with the instant invention to provide improved hollow glass fibers.

In the accompanying drawing looking at FIGS. 1 and 2 there is shown a bushing indicated at 1, having a tip plate, faceplate or bottom member 13 (hereinafter called tip plate), in which are positioned as shown in FIG. 2 four bushing tips 7. While four tips are shown in FIG. 2 it will be of course understood by the skilled artisan more than the four tips shown can be employed, if desired. Thus, while the bushing in FIG. 2 contains four fiber forming tips it will be understood by the skilled artisan that the number of tips can be increased to any suitable number to provide the requisite number of filaments per strand desired for a given strand product. Positioned concentric with the inside walls of the bushing tip 7 and located centrally therein is an gas delivery tube 10 having a central channel 9 communicating with an air passageway 4 in an air manifold member 6. Again as shown in the drawing of FIG. 2, each air manifold 6 is shown feeding a single bushing tip through a single gas delivery tube 10 which in turn feeds a single bushing tip 7. In practice in a large bushing, where multiple bushing tips are typically arranged in rows, the gas manifold 6 and its associated gas chamber 4 would feed multiple, aligned tubes 10 which would be located in and feed a multiplicity of tips 7.

At the base, the gas delivery tube 10 is internally chamfered to an opening a 17 which is larger in diameter than the conduit 9 through which gas is introduced to opening 17. Conduit 9 and the tip 7 terminate in the same horizontal plane and discharge their contents to the atmosphere in that same horizontal plane. The arrangement of the outside wall of the concentric tube 10 and interior walls of the tip 7 provide an annulus 16, which surrounds the bottom section of the tube 10. The annulus 16 provides a passageway through which glass accumulating in the area 25 of the bushing tip is passed outside of the bushing proper to the atmosphere. As can be seen clearly in the drawing of FIG. 1, the glass emanating from the annulus 16 and the air leaving chamber 17 at 18 enter the atmosphere together. An important consideration in providing the gas tube 10 with the expanded bottom section for the introduction of air is to establish an air column having a diameter in relation to the outside diameter of the annulus that is substantially the same as the ratio of internal to external diameter desired in the final hollow product. Thus, providing this desired ratio within the bushing tip it is found that the glass cone 8 in its final solidified filament form possesses a ratio of lumen diameter to external fiber diameter approximately the same as the ratio of the internal diameter of gas conduit 9 at point 18 to the internal diameter of tip 7. By machining the tip 7 and tube 10 such that the diameter of opening 18 in conduit 9 and the internal diameter of tip 7 are correlated to provide a ratio of internal lumen to external fiber diameter that is desired in the final product, hollow glass fibers of that approximate desired ratio will be readily obtained.

In the preferred construction of the bushing in accordance with the instant invention a bracket member 11 is provided around the external surface of the gas delivery tube 10. Holes 24 are provided in tip plate 13 and the side, pieces or tabs 14 of the bracket member 11 are inserted through the holes 24 in the faceplate 13. One of these tabs is shown inserted through the hole 24 on the right hand side of FIG. 1. The configuration shown on the left hand side of the same figure shows the finished version of this bracket member. Thus, the bracket 14 as shown on the right hand side of the drawing is inserted through the hole 24 in the bushing tip plate 13. After insertion a welding torch is applied to the surface of the tab 14 which is protruding below the tip plate 13 and it is heated to its melting point. The tab 14 is designed in mass so that when heat is applied and the metal melts, it forms the button 15 shown on the left hand side of FIG. 1 in the tip plate thereby becoming a part of that tip plate. In finished form, the right side of the orifice in FIG. 1 will look the same as the left side as shown. The arms 14 of the bracket 11 become an integral part of the tip plate 13 and the upper section of the bracket 11 is welded to the outside wall of the gas delivery tube 10 at weld 22. This arrangement coupled with the rigid attachment of tube 10 through wall 30 to gas conduit 6 provides a truss arrangement for the tip plate 13. Since the bracket ends are now an integral part of the faceplate 13, movement of the faceplate 13 due to any slight warpage over time during use will be minimized and will cause the delivery tube 10 to move in any direction that the tip 7 moves as a result of such warpage. Furthermore, the described truss arrangement is such that it provides a tip plate that has a substantially reduced tendency to sag thereby maintaining the tube 10 and tip 7 spatially constant with respect to each other during use. The tips 7 are welded to the faceplate 13 at welds 23 in a manner conventional to those skilled in the art. The bushing 1 itself is electrically heated as shown in FIG. 2. This heat is applied through a suitable bushing connector 3 which is connected to an electrical terminal 12. The terminal 12 is normally attached to the secondary of a power transformer not shown but this arrangement is well understood by those skilled in the art, and can be readily found in the book "The Manufacturing Technology of Continuous Glass Fibers", by K. L. Lowenstein, Elsevier Publishing Co., 1973, Chapter V.

In conducting the process of the instant invention, molten glass from a suitable glass source is passed into the bushing 1 and passes downwardly through the area 25 above each of the bushing tips 7 and out to the atmosphere through annulus 16 in each of the bushing tips 7. A gas stream, preferably air, is passed through manifold 6 via conduit 4 through the central passageway 9 into an air delivery tube 10 associated with each of the bushing tips 7. This air is passed downwardly in passageway 9 of tube 10 to the flared opening 17, and exits the tips at the same horizontal planar level as the molten glass emanating from through annulus 16. By flaring the opening of the passageway 9 at point 17 in the manner shown in the drawing the air stream exiting the end of tip 7 at 18 is larger in diameter than heretofore used in the aforementioned prior art patents. This provision of a larger diameter for the gas avoids the characteristic bulging of the cone of molten glass as shown by the prior art exemplified by U.S. Pat. No. 3,268,313. Further, less air pressure is required to form the fiber lumen in the glass cone used to form the fibers with this arrangement. A more stable attenuation process is therefore achieved and more uniform and concentric lumens are provided in the glass fibers because the diameter of the air stream and the glass stream at the tip at point 18 are in approximately the same proportion as the desired end product, a condition which is not found to be true in the above referred to prior art. The lumen of the fibers formed are centrally located and are constantly in the same position regardless of whether or not the bushing tip plate should distort. The firm connection between the bracket member 11, the bushing tip plate 13 and the tube 10 maintains their spatial relationship constant. The welds 22 between the tube 10 and the bracket member 11 and the solid connection or button 15 formed by the side arm tabs 14 of the brackets 11 in the holes 24 provided in the faceplate for the tabs 14 and the welded attachment of conduit 6 to tube 10 at the other end provide a rigid, secure, truss-type attachment which substantially supports the tip plate 13 during use to help prevent any substantial distortion of the tip plate, thus keeping the tube 10 and the tip 7 in their constructed spatial relationship during operation.

The bushing 1 of the figures shown may be constructed of any suitable bushing material utilized by the current state of the art. Typically the bushings utilized in the instant application are constructed of precious metals, primarily platinum and platinum-rhodium alloy. An 80% platinum 20% rhodium alloy by weight is the preferred bushing material and is utilized not only for the bushing but for all other associated equipment such as the air distribution tubes, manifolds and so forth. Any surface in contact with the molten glass is thus in general a platinum rhodium alloy or its equivalent. Recourse to the utilization of zirconia stabilized or other grain stabilized platinum or platinum alloys may also be had as well as recourse to ceramic coatings on the bushing and exterior supports where glass fiber compositions requiring heat in the bushing above 2300° are required.

Satisfactory hollow fibers may be produced utilizing the bushing and method herein described. In general, any glass composition which can be formed into a glass fiber will satisfactorily produce hollow fibers in accordance with the novel apparatus of the instant invention.

While the invention has been described with reference to certain methods and illustrative embodiments, it is not intended that the invention be so limited except insofar as appears in the accompanying claims.

I claim:

1. Apparatus for producing hollow glass fibers comprising a source of molten glass, a bushing having a plurality of orifices therethrough for passage of molten glass streams from said source, a plurality of tubes extending into each orifice and terminating in the same plane as the terminus of the said orifices, said tubes restricting the orifices to form an annulus therein and having a central gas passageway therein throughout the length of the orifice, the diameter of said passageway and the diameter of the orifice being such that they correspond to the ratio of the internal diameter to the external diameter desired in the fibers drawn from said apparatus and means for feeding gas to said tubes.

2. Apparatus of claim 1, wherein the ratio of the inside diameter of said tube and the inside diameter of said orifice is between 0.5 and 0.9.

3. Apparatus of claim 1, wherein the ratio of the inside diameter of said tube and the inside diameter of said orifice is between 0.6 and 0.8.

4. Apparatus of claim 1 or 2 or 3 including means to attach each end of said tube to said bushing adjacent their respective orifice to insure that there is no relative movement between orifice and associated tube.

5. In a hollow fiber forming bushing, wherein a gas is fed to molten glass emanating from the bushing through a multiplicity of hollow tips depending from the bushing, each tip having a tube with a centrally defined gas passage therein forming with the walls of said tips an annulus through said tips for glass to pass therethrough and means to pass gas through said tubes, the improvement comprising: regulating the diameter of the gas passage and the diameter of the annulus to provide a ratio corresponding to the ratio of internal diameter to external diameter in the hollow fiber produced by said bushing and causing the gas passage and the annulus to terminate in the same plane.

6. The bushing of claim 5, wherein the regulated ratio is between 0.5 and 0.9.

7. The bushing of claim 5, wherein the regulated ratio is between 0.6 and 0.8.

8. The bushing of claim 5 or 6 or 7 including means to attach each of said tubes to the bushing adjacent each of their respective tips to insure that there is no relative movement between the tips and the tubes.

9. A method of forming hollow glass fibers comprising feeding molten glass from a molten glass source through a plurality of fiber forming tips, passing a gas stream through a tube positioned inside of and concentric with the walls of said tips to thereby cause the molten glass to pass through an annulus around said tube, passing a gas through the center of the molten glass as it exits the tip at a pressure sufficient to provide a hollow center in said glass as it solidifies in the atmosphere said glass and said gas exiting the tip in the same plane and regulating the ratio of the internal diameter to external diameter of the fibers formed by controlling the diameter of the tube and the diameter of the annulus to values which provide the ratio desired in the fibers produced at the bushing tip.

10. The method of claim 9, wherein the diameter of the tube and the diameter of the tip are sized to provide a fiber having an internal diameter to external diameter ratio of 0.5 to 0.9.

11. The method of claim 10, wherein the diameter of the tube and the diameter of the tip are sized to provide a fiber having an internal diameter to external diameter of 0.6 to 0.8.

* * * * *